June 9, 1959 P. THIEME 2,889,645
FRAMES FOR DIAPOSITIVES OR THE LIKE
Filed May 31, 1957

Inventor:
P. Thieme
By Glascock Downing Seebold
Attys.

United States Patent Office 2,889,645
Patented June 9, 1959

2,889,645

FRAMES FOR DIAPOSITIVES OR THE LIKE

Peter Thieme, Berlin-Zehlendorf, Germany

Application May 31, 1957, Serial No. 662,677

Claims priority, application Germany June 6, 1956

5 Claims. (Cl. 40—152)

This invention relates to a frame for diapositives or the like, in which two frame members are provided, between which the film or the like to be projected is supported. For the supporting of the film it is already known to provide two glass plates. These glass plates are on the market in thicknesses of about 1 millimetre. They exhibit however an allowance of at least 4/10 mm., as the thickness varies from 0.8 mm. to 1.2 mm. In consequence of this fluctuation in the thickness there is a corresponding variation in the distance between the image on the film and the centre of the focussing or objective lens of the projector, which has the result that the plane of sharp focus of the picture is altered. After each change of the frames in the projector, the sharpness of focus has to be adjusted.

According to this invention, this disadvantage of known frames, in which the film to be projected is located between the aforementioned glass plates, is obviated by the fact that the glass plates are lodged in such deep recesses in the frame members that they lie above and below the film or the like to be projected without pressure, independently of their thickness. The sharpness of focus, when once adjusted on the projector appliances, is maintained, since the glass plates, located on both sides of the film to be projected, leave the position of the film, which is gripped between the marginal portions of the frame unaltered. The recesses for supporting the glass plates in the frame members must accordingly be so deep that they can accommodate glass plates 1.2 mm. thick on both sides of the film. A slight curvature of the image, occurring under particularly unfavourable conditions as regards the thickness of the glass plates, is so small that it is of no practical importance for the projection, in view of the comparatively great depth of focal field of the projection devices. On the other hand the film image is so loosely supported in the frame according to the invention that it remains capable of "breathing" when the temperature and humidity of the atmosphere fluctuate, thus obviating the formation of the objectionable water of condensation.

The surface of the glass plate that comes into contact with the blank side of the film is roughened, according to a preferred form of the invention. This obviates the formation, as a result of the intimate contact of the blank side of the film with the corresponding cover glass, of the so-called Newton's rings, which have a disturbing influence on the projection.

It is included in the ambit of the invention to support the film, that is to say, to grip the film in the frame members, only on the perforated surfaces.

Further details of the invention will be gathered from the constructional example illustrated in the accompanying drawings, in which.

Figure 1:
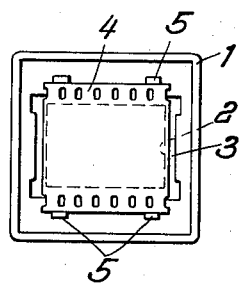
Figure 1 shows a plan view of the main frame member, with a piece of film placed therein.
Figure 2:
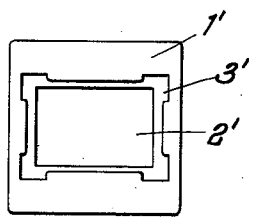
Figure 2 shows the cover member in plan.
Figure 3:
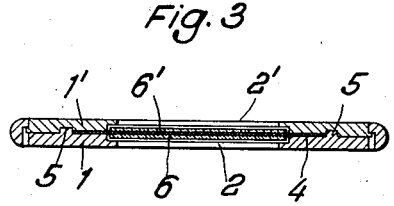
Figure 3 shows the assembled frame members according to Figures 1 and 2 in longitudinal section.
Figure 4:
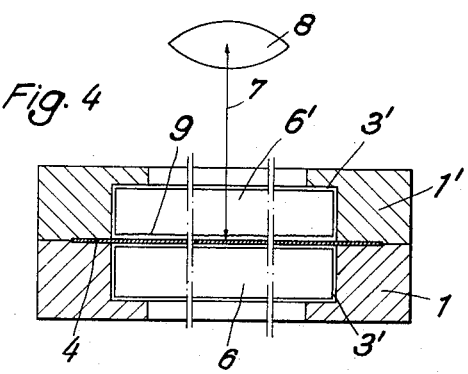
Figure 4 shows somewhat diagrammatically an enlarged sectional view through the assembled frame.

As will be gathered from Figure 1, in the main frame member 1, which has a cut-out aperture 2, a glass plate is placed in the correspondingly provided recess 3, so that the aperture 2 is covered by the glass plate. On the glass plate is placed the film strip 4, for instance a film 35 mm. wide, the length of section of which is about 37 mm., and which contains a picture 24 x 36 mm. The film now bears against abutments 5. The cover member 1' of the frame likewise exhibits a rectangular opening 2'. For the accommodation of the glass plate to be laid upon the film strip 4, the recess 3' is provided. The cover member 1' is inserted in the main frame member 1 in the usual manner, and is held in its position by fastening means known in themselves and not further described. The assembled position of the frame members is shown by Figures 3 and 4. As will be gathered from Figure 3, the cover member 1' is pressed into the main frame member 1. The film 4 is thus gripped between the marginal portions of the frame. Moreover the glass plates 6 and 6' are held by the frame members in the corresponding recesses 3 and 3'. As will be gathered from the diagrammatic sectional view Figure 4, the recesses 3 and 3' are so shaped, that is to say, they are so deeply recessed, that they accommodate the glass plates without pressure independently of their thickness, that is to say, the glass plates do not displace the film 4 supported between them from the position which it receives owing to the gripping of its edges between the frame halves 1 and 1'. Consequently the distance 7 of the gripped film from the focussing lens 8 of the projector remains constant, independently of the thickness of the cover glasses 6 and 6'.

The surface 9 of the glass plate 6', which comes into contact with the film 4, is roughened. This obviates the formation, upon contact of this surface of the glass with the blank side of the film, of the so-called Newton's rings, which would have a disturbing appearance in projection.

As Figure 1 shows, the film is gripped between the frame members 1 and 1' along the perforated edges only.

I claim:

1. A frame to support a film transparency comprising a pair of relatively rigid frame elements for face to face abutment to grip a film transparency therebetween, aligned apertures in each of said frame elements to define the area of film to be projected, said apertures being of lesser area than the area of film to be supported, whereby said film is gripped between said frame elements on at least two edges, sheets of glass to be positioned one on each side of said film when clamped between said frame elements, the edges of said apertures being rabbeted on the side of said frame elements toward said film to a depth greater than the thickness of said sheets of glass to receive and loosely hold said sheets of glass and retain them in position to close said apertures and to overlie without pressure a transparency gripped between said frame elements.

2. The frame of claim 1, in which one of said glass plates presents a roughened surface toward the smooth side of a film when gripped between said frame elements.

3. A frame for holding film transparencies for projection comprising a pair of thin flat frame elements of a size and shape for use in a projector, said frame elements having apertures therethrough to define the film area to be projected and in use being secured in face to face contact with at least two edges of the film to be projected clamped therebetween, the said apertures presenting rabbets toward said film, a plate of glass for each said frame element of a size to be held loosely in position in said aperture, said rabbets being of a depth greater than the greatest thickness of said plates, whereby said plates of glass cannot be pressed against said film transparency.

4. The frame of claim 3, in which one of said plates of glass has a frosted side presented toward the film transparency whereby formation of Newton's rings is avoided.

5. A glass plate protected film transparency comprising a film, a two-part frame in which the film is held marginally between the two parts so that each face of the film forms with its adjacent frame portion a shallow recess, characterized by a pair of protective glass plates one of which is inserted in each recess, and one of said protective glass plates presents a ground surface toward said film transparency.

References Cited in the file of this patent

UNITED STATES PATENTS

| | | |
|---|---|---|
| 2,496,008 | Jablon | Jan. 31, 1950 |
| 2,505,250 | Kime | Apr. 25, 1950 |
| 2,516,243 | Murphy | July 25, 1950 |
| 2,572,454 | Down et al. | Oct. 23, 1951 |